(12) United States Patent
Battistello et al.

(10) Patent No.: US 6,611,942 B1
(45) Date of Patent: Aug. 26, 2003

(54) TRANSMITTER, RECEIVER, METHOD AND SYSTEM FOR SAFE TELECOMMUNICATION OF CELLS

(75) Inventors: Patrick Battistello, Perros-Gulrec (FR); Andre Jaillard, Lannion (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 09/529,513
(22) PCT Filed: Sep. 28, 1998
(86) PCT No.: PCT/FR98/02080
§ 371 (c)(1),
(2), (4) Date: Jun. 19, 2000
(87) PCT Pub. No.: WO99/20076
PCT Pub. Date: Apr. 22, 1999

(30) Foreign Application Priority Data

Oct. 14, 1997 (FR) ............................................. 97 13076

(51) Int. Cl.⁷ ........................... H04Q 11/04; H04L 1/02; H04L 1/22
(52) U.S. Cl. ........................ 714/821; 714/820; 370/216
(58) Field of Search ............................ 714/821, 4, 820, 714/712; 370/216

(56) References Cited

U.S. PATENT DOCUMENTS

| | | | | |
|---|---|---|---|---|
| 5,285,441 A | * | 2/1994 | Bansal et al. | 370/218 |
| 5,425,029 A | * | 6/1995 | Hluchyj et al. | 370/235 |
| 5,440,565 A | * | 8/1995 | Miyamoto et al. | 370/241.1 |
| 5,621,722 A | * | 4/1997 | Edmaier et al. | 340/2.23 |
| 5,631,896 A | * | 5/1997 | Kawase et al. | 370/235 |

FOREIGN PATENT DOCUMENTS

| | | | |
|---|---|---|---|
| EP | 0 566 241 | 10/1993 | |
| EP | 0 566 241 A2 * | 10/1993 | H04L/1/22 |
| EP | 0 696 111 | 2/1996 | |
| EP | 0 696 111 A2 * | 2/1996 | H04B/1/74 |

OTHER PUBLICATIONS

Hidep Tatsuno et al., "Hitless Path Protection Switching Techniques for ATM Networks," Electronics and Communications in Japan, Part I—Communications, vol. 77, No. 8, Aug. 1, 1994, pp. 13–23.*

Hiroshi Ohtaq et al., "hitless Line Protection Switching Method for ATM Networks", Proceedings of the International Conference on Communications (ICC) Geneva, May 23–26, 1993, pp. 272–276.*

Hideo Tatsuno et al, "Hitless Path Protection Switching Techniques for ATM Networks," *Electronics and Communications in Japan, Part I—Communications*, vol. 77, No. 8, Aug. 1, 1994, pp. 13–23.

Hiroshi Ohta et al, "Hitless Line Protection Switching Method for ATM Networks," *Proceedings of the International Conference on Communications (ICC)*, Geneva, May 23–26, 1993, vol. 1, May 23, 1993, pp. 272–276.

* cited by examiner

Primary Examiner—Albert Decady
Assistant Examiner—William Moore
(74) Attorney, Agent, or Firm—Lowe Hauptman Gilman & Berner, LLP

(57) ABSTRACT

The present invention concerns a method of protecting the transmission of cells in a telecommunication system, the method consisting, on the transmitter side, of simultaneously transmitting two identical flows of cells on two distinct physical links and, on the receiver side, of receiving each of the two flows of cells respectively transmitted on the said two links and selecting one of them. The method further consists, on the transmitter side, of inserting, regularly in each of the flows, cells serving as markers and thus delimiting blocks of cells or sets of blocks of cells, and, on the receiver side, of selecting, block after block or group of blocks after group of blocks, the block or group of blocks from the flow of cells which has the fewer transmission errors compared with the block or group of blocks of the same order number in the other flow.

22 Claims, 3 Drawing Sheets

TRANSMITTER, RECEIVER, METHOD AND SYSTEM FOR SAFE TELECOMMUNICATION OF CELLS

The present invention concerns a method of protecting the transmission of cells in a telecommunication system, notably a broadband telecommunication system, such as the so-called broadband ISDN broadband network designed to transmit ATM (Asynchronous Transfer Mode) cells. More precisely, the method of the invention relates to the Transmission Convergence (TC) sub-layer of any ATM transmission system and can apply, in particular, both to the so-called SONET/SDH systems and to the so-called cell-based systems such as those described in ITU-T Recommendation I.432.

It should be stated that the Protocol Reference Model PRM of the broadband ISDN provides a physical layer which is itself subdivided into two sub-layers which are respectively the physical medium PM sub-layer and the transmission convergence TC sub-layer. The PM sub-layer includes the functions which depend only on the physical medium used. As for the TC sub-layer, this covers the functions for frame generation and recovery, adaptation to the transmission frame, delimiting the cells, generation of the so-called HEC (Header Error Control) error control code, and the transmission speed adaptation functions. Thus, the transmission convergence TC sub-layer provides, on the transmitter side, the binary functions necessary for transmitting the ATM cells on the physical medium and, on the receiver side, the functions necessary for extracting the ATM cells from the received binary stream.

In the networks, since the physical medium can be subject to various perturbations, it is possible that the ATM cells are erroneous on reception and therefore have to be destroyed. In order to reduce the rate of loss, and increase the quality of the transmission, a method has already been proposed which consists of doubling the physical medium, that is to say using two transmission links instead of only one. Such a method is now described in relation to FIG. 1.

Figure 1:
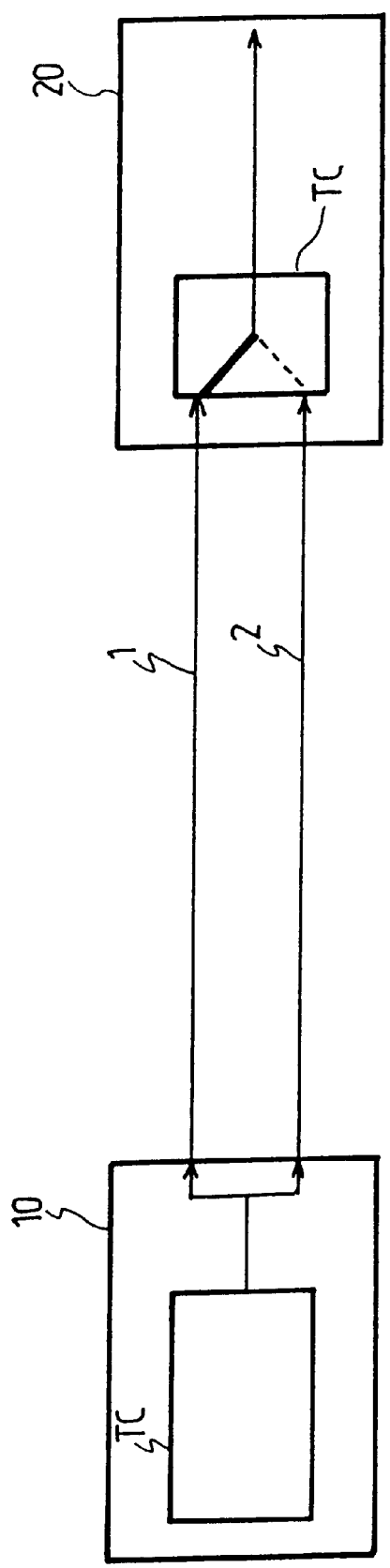

FIG. 1 shows a transmitter 10 whose Transmission Convergence sub-layer TC implements the functions necessary for transmitting the ATM cells in a binary stream simultaneously on two links 1 and 2. It also shows a receiver 20 whose sub-layer TC normally extracts the cells from the first link 1 but, in the event of unavailability of the first link 1, switches to the second link 2 in order to extract the cells therefrom.

It should be noted that the function for determining errors in the cells carried by the links 1 and 2 and the switching function are taken care of by the convergence sub-layer TC of the receiver 20.

The drawback of this method is essentially connected with the switching between the two links 1 and 2 which is not instantaneous, which leads to the loss of data during the switching time.

A method proposed at the IEICE conference on Mar. 27 to 30, 1995 and presented by Hiroshi Ohta and Hitoshi Uematsu consists in that the Transmission Convergence (TC) sub-layer of the transmitter implements the functions necessary for transmitting the ATM cells simultaneously on two links, and in that two TC sub-layers of the receiver respectively implement the functions for extracting the ATM cells from the data received from the two links. On account of the main and secondary links a priori having different lengths, a mechanism is provided in the receiver to compensate for the difference in transmission time between the flows issuing from the two links, and thus resynchronize these flows of ATM cells. When the receiver detects an incorrect cell on the main link, the mechanism then switches to the secondary link. But unlike the previous case, and in order to solve the problem mentioned above, the switching takes place on the cell preceding this erroneous cell, so that there is no switching delay. It should be noted that the same rule applies to the secondary link.

This prior method has the advantage of implementing the switching between two transmission links with no loss of ATM cells. This is because the ATM cells received on each link are phased to compensate for the difference in transmission time between the two links, and as soon as the system detects errors on one of the links, it goes over to the other, settling on the cell which precedes the one where the error was detected.

Nevertheless, when the receiver detects an erroneous cell on one of the links, it switches to the second, but nothing guarantees that the latter is actually available.

The aim of the invention is therefore to propose a method of protecting the transmission of cells in a protecting telecommunication system such as just described but which does not have the drawback thereof mentioned above.

To do this, the said method consists, on the transmitter side, of inserting, regularly in each of the said flows, cells serving as markers and thus delimiting blocks of cells or sets of blocks of cells, and, on the receiver side, of selecting, block after block or group of blocks after group of blocks, the block or group of blocks from the flow of cells which has the fewer transmission errors compared with the block or group of blocks of the same order number in the other flow.

According to another characteristic of the invention, it consists of delimiting blocks or sets of blocks each having a physical cell containing information concerning the errors in the said block or in each of the said blocks of the said set, and in that it consists of selecting the block or group of blocks from one of the said flows for which an examination of the error information concerning it contained in the said physical cell shows that it has the fewer errors.

According to another characteristic of the invention, it consists of using the said physical cells containing the error information as cells serving as markers for blocks or sets of blocks.

According to another characteristic of the invention, when the protection method according to the invention is applied to a telecommunication system in which the transmission of cells on each link takes place in cell-based mode, it consists of using, as cells serving as markers for blocks or sets of blocks, the so-called OAM F3 cells.

According to another characteristic of the invention, it consists:
  if the two blocks or two groups of blocks belonging respectively to the two links are judged correct, of choosing indiscriminately either block or group of blocks,
  if the block or group of blocks carried by the first link is judged correct whereas the block or group of blocks carried by the second link is judged incorrect, of selecting the block or group of blocks carried by the first link,
  if, conversely, the block or group of blocks carried by the second link is judged correct whereas the block or group of blocks carried by the first link is judged incorrect, of selecting the block or group of blocks carried by the second link, and, finally
  if the two blocks or two groups of blocks are judged incorrect, of using a selection process other than the block by block or group of blocks by group of blocks selection process.

For example, according to another characteristic of the invention, the said other selection process consists of performing a so-called cell by cell selection for each cell contained in each of the said two blocks. For example, the said cell by cell selection process consists of selecting the cell from one or other link which has the fewer errors in its header. Advantageously, the said cell by cell selection is based on the use of the syndrome of the so-called HEC field contained in the header of each cell.

According to another characteristic of the invention, the said cell by cell selection is based on the use, on the one hand, of the syndrome of the so-called HEC field contained in the header of the current cell and, on the other hand, of the syndrome of the so-called HEC field contained in the header of the following cell.

According to another characteristic of the invention, the said cell by cell selection consists of:

if the syndromes $HEC(C_{N,1})$ and $HEC(C_{N,2})$ are equal and if the same applies to the syndromes $HEC(C_{N+1,1})$ and $HEC(C_{N+1,2})$, choosing either cell indiscriminately, if the syndromes $HEC(C_{N,1})$ and $HEC(C_{N,2})$ are equal whereas a comparison of the syndrome $HEC(C_{N+1,1})$ with the syndrome $HEC(C_{N+1,2})$ shows that the cell $(C_{N+1,1})$ on the first link is less erroneous than the cell $(C_{N+1,2})$ on the second link, selecting the cell $C_{N,1}$, if the syndromes $HEC(C_{N,1})$ and $HEC(C_{N,2})$ are equal whereas a comparison of the syndrome $HEC(C_{N+1,1})$ with the syndrome $HEC(C_{N+1,2})$ shows that the cell $(C_{N+1,1})$ on the first link is more erroneous than the cell $(C_{N+1,2})$ on the second link, selecting the cell $C_{N,2}$, if a comparison of the syndrome $HEC(C_{N,1})$ with the syndrome $HEC(C_{N,2})$ shows that the cell $(C_{N,1})$ on the first link is less erroneous than the cell $(C_{N,2})$ on the second link, selecting the cell $(C_{N,1})$, and finally if a comparison of the syndrome $HEC(C_{N,1})$ with the syndrome $HEC(C_{N,2})$ shows that the cell $(C_{N,1})$ on the first link is more erroneous than the cell $(C_{N,2})$ on the second link, selecting the cell $(C_{N,2})$, $HEC(C_{N,x})$ being the function whose value represents the number of erroneous bits in the header of the cell of order N in the block under consideration and x being the number of the link on which the said cell is carried.

According to another characteristic of the invention, where the block by block or group of blocks by group of blocks selection is not used at a given moment, it consists of performing a cell by cell selection.

According to another characteristic of the invention, it consists, on the transmitter side, of inserting regularly, in each of the said flows, cells having an order number which is used for synchronizing the flows issuing respectively from the two links.

Figure 2:
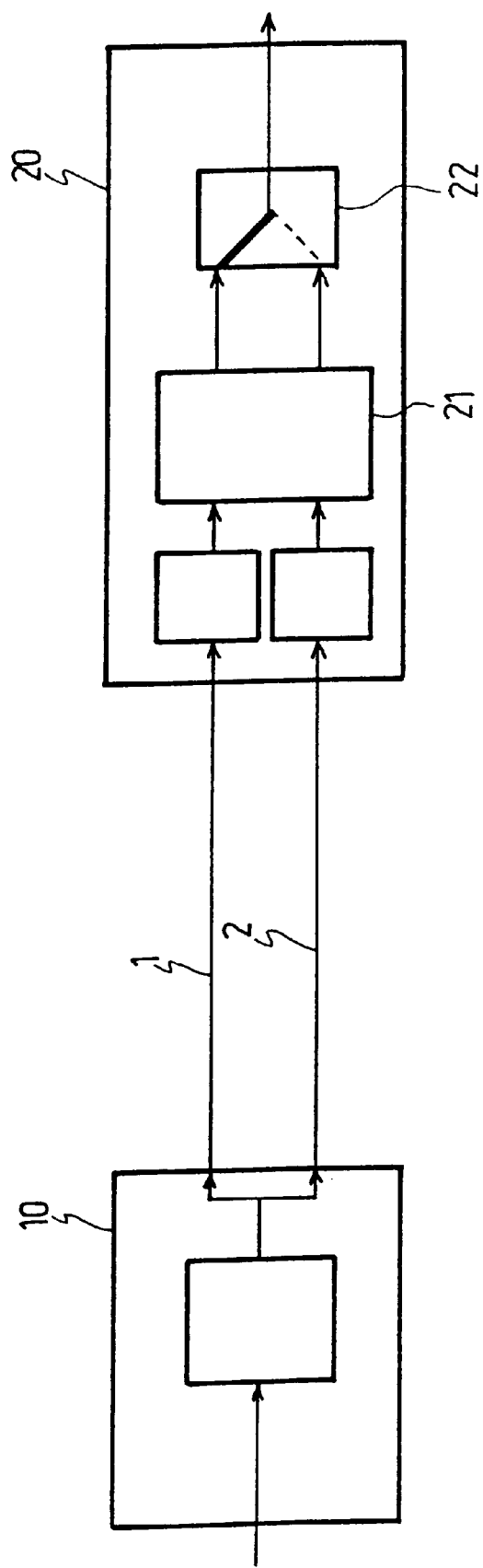
Figure 3:
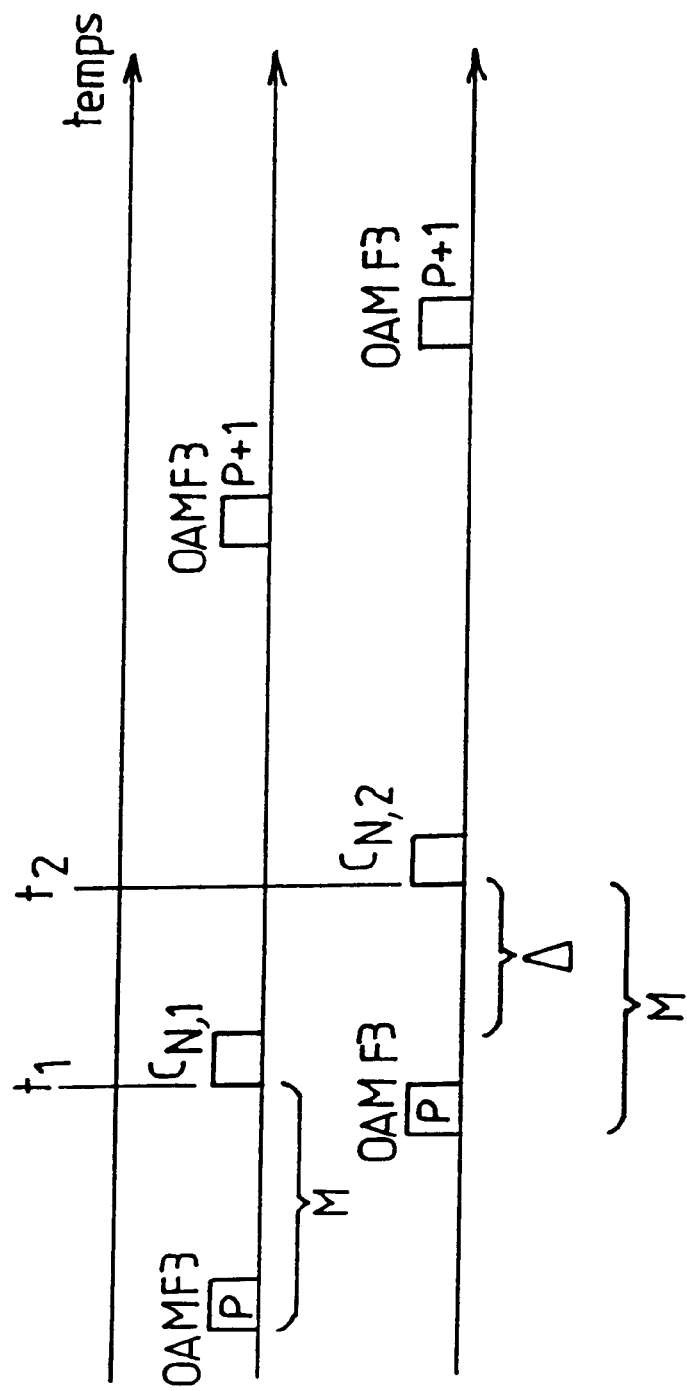

The characteristics of the invention mentioned above, as well as others, will emerge more clearly from a reading of the following description of an example embodiment given in relation to the accompanying drawings among which:

FIG. 1 depicts a transmission system using a protection method according to the prior art, FIG. 2 depicts a transmission system using a protection method according to the present invention, and FIG. 3 is a diagram illustrating a protection method according to the present invention.

The method of the present invention is illustrated by means of FIG. 2 in which there can be seen a transmitter 10 having a unit TC providing the functions of the transmission convergence TC sub-layer. This unit TC receives a flow of ATM cells and prepares it for its simultaneous transmission on two transmission links 1 and 2.

There can also be seen a receiver 20 which is equipped with two units TC1 and TC2 which each provide the functions of the transmission convergence sub-layer. In particular, each unit TC1, TC2 extracts the transmitted cells from the data flow received on the corresponding link 1, 2 and delivers them at the output.

The transmission mode on the links 1 and 2 may for example be a synchronous transmission mode of the SDH (Synchronous Digital Hierarchy) type according to which the cells are arranged in frames. ITU-T recommendations G.707 to 709 can be referred to for a definition of the specifications of this transmission mode.

The transmission mode may also be a so-called "cell-based" transmission mode according to which the cells are arranged in a continuous flow. Physical layer cells, that is to say cells which are not taken into account at the ATM layer, are inserted after a certain number of ATM layer cells (referred to as ATM cells). These physical layer cells can be either empty cells, or OAM (Operation, Administration and Maintenance) cells. The latter are used to convey information concerning the operation, administration and maintenance of an interface. In a flow of cells transmitted according to the cell-based transmission mode, the OAM cells of the physical layer are inserted periodically, that is to say the number of ATM cells between two consecutive OAM cells is constant.

The cells delivered by both links are aligned in a cell synchronization device 21. There will now be described, in relation to FIG. 3, the cell alignment process of the invention.

There will be considered any ATM cell $C_N$ which is transmitted at the instant t by the convergence sub-layer TC of the transmitter 10. On its reception from the link 1 by the unit TC1 providing the functions of the convergence sub-layer, this cell $C_N$ is extracted at the instant t1 by the same convergence sub-layer unit TC1 and the cell $C_{N,1}$ is delivered by the unit TC1. Similarly, on its reception from the link 2 by the unit TC2, this cell $C_N$ is extracted at the instant t2 by the same convergence sub-layer unit TC2 and the cell $C_{N,2}$ is delivered by the unit TC2. The two links 1 and 2 having a priori and generally different lengths, the instants t1 and t2 are generally different. In FIG. 3, the instant t1 is earlier than the instant t2. This results from the fact that the link 1 is shorter than the link 2.

The cell synchronization device 21 is equipped with a memory in which the cells from the shorter link are stored. This is because, in order to synchronize the cells received on the two links 1 and 2, the cell $C_{N,1}$ must wait for the reception of $\Delta$ cells before the reception of the corresponding cell $C_{N,2}$. The memory of the said synchronization device 21 must allow the storage of at least $\Delta$ cells. Thus, in order to determine this memory capacity, the time difference t2–t1 which it is wished to be in a position to handle must be considered. However, this time difference depends both on the difference in length between the two links 1 and 2 and also on the transmission speed on the links 1 and 2. It should be understand that storing the cells makes it possible to compensate for the difference in transmission time between the two links.

To align the cells, time markers will be used. To do this, when the transmission mode on the links 1 and 2 corresponds to the so-called cell-based transmission mode, the physical level OAM F3 cells are used as time markers. As was explained previously, these OAM F3 cells are inserted periodically in the flow of ATM cells, that is to say the number of cells between two consecutive OAM F3 cells is constant. Furthermore, the physical level OAM F3 cells have a field in which their order number is indicated, which makes it possible to differentiate them from one another.

In this way, it is known that the cell $C_{N,2}$ which arrives M cells after the OAM F3 cell numbered P on the link 2 is the image of the cell $C_{N,1}$ which arrived M cells after the OAM F3 cell numbered P on the link 1.

When the transmission modes on the links 1 and 2 are not the so-called cell-based mode, but, for example, the SDH transmission mode, there will be inserted, periodically, OAM F3 cells or any other type of cells having an order number and capable of serving as time markers in the flow of cells.

Each flow of cells delivered by the synchronization device 21 is delivered to an input of a selection device 22 which in its turn delivers a flow of ATM level cells.

According to a first embodiment of the invention, a block of cells is defined as being the set of cells between two consecutive OAM F3 cells. In FIG. 3, a block of cells is for example the set of cells between the OAM F3 cell of number P and the OAM F3 cell of number P+1. Since the OAM F3 cells are inserted periodically, each block has a constant size. It should be noted that each block may contain ATM level cells, unassigned ATM layer cells, and physical layer cells such as the so-called "idle"inactive cells which are used for adapting the cell rate. The selection device 22 then considers, in each flow issuing from the synchronization device 21, the blocks of cells delimited by the OAM F3 cells. The OAM F3 cells contain parity check fields indicating whether transmission errors have occurred in a block of cells. The validity of the block of cells which follows the OAM F3 cell of number P is determined on reception and by means of the OAM F3 cell of number P+1.

It should be stated that the ATM cells are composed of a header having five octets followed by a user information field composed of 48 octets. The check fields present in the OAM F3 cells make it possible to establish the validity of the information transported by the payload or information field of the ATM cells of the block. As for the validity of the header of each cell, this is determined from a specific field which this header contains, also referred to as an HEC (Header Error Check) field. This field is composed of one octet which is the last in the header of each cell.

According to the invention, for each transmission link, a block of cells is stored after reception of an OAM F3 cell, for example of number P, until reception of the following OAM F3 cell, that is to say that of number P+1. At that moment, the selection device 22 determines whether each stored block of cells is correct. To do this, it uses, on the one hand, the OAM F3 cell corresponding to this block (here the OAM F3 cell of number P+1) in order to determine the validity of the payload of the cells in the block and, on the other hand, the HEC fields of cells in order to determine the validity of the headers of these cells. Thus, the device 22 considers a block as correct if no transmission error has occurred, both in their payload and in the header of the cells.

It should be noted that verification of the blocks of cells is performed in parallel on the two transmission links, which assumes that the cell synchronization process has been carried out.

According to a second embodiment of the invention, still in the case of transmission according to the so-called "cell-based" mode, the selection device 22 considers, in each flow issuing from the synchronization device 21, blocks which are subsets of the previously considered blocks delimited by OAM F3 cells. For example, the selection device 22 considers each of the eight blocks, defined logically, which are between two OAM F3 cells respectively of number P and P+1. The OAM F3 cell of number P+1 contains the information on the validity of each of the eight blocks which have arrived since the previous OAM F3 cell. Thus, on reception of this OAM F3 cell of number P+1, the selection device 22 can select the valid blocks from either link on the basis of the information contained in this cell.

It should be noted that, in this mode, the selection device 22 could equally well select, group of blocks after group of blocks, the group of blocks which was judged valid on the basis of the information contained in the OAM F3 cell corresponding to the set of blocks to which this group of blocks belongs. A group of blocks is composed of a predefined number, for example, two, three, or more, blocks.

According to a third embodiment, in the case of transmission according to modes other than the so-called "cell-based" mode, the device 22 considers blocks of cells delimited by the cells serving as time markers. There also, these cells contain information on any transmission errors which have taken place in the blocks they delimit. It should be noted that these may be OAM F3 type cells. However, the validity check fields transported by the OAM F3 cells may be replaced by any other type of parity check field, transported in the time marking cells used for synchronizing the two links.

According to a fourth embodiment, also in the case of transmission according to modes other than the so-called "cell-based" mode, the device 22 considers blocks of cells which are subsets of the blocks delimited by cells serving as time markers.

The case will now be looked at of transmission in so-called "cell-based" mode, and the block of cells Bp,1 considered, which is between the OAM F3 cell of number P and that of number P+1 and which is carried by the link 1. Similarly, the block of cells Bp,2 will be considered, which is between the OAM F3 cells of number P and number P+1 and which is carried by the link 2. The selection method according to the invention is as follows:

if the two blocks $B_{P,1}$ and $B_{P,2}$ are judged correct, then either block $B_{P,1}$ or $B_{P,2}$ is chosen indiscriminately, if the block $B_{P,1}$ carried by the link 2 is judged correct whereas the block $B_{P,2}$ carried by the link 2 is judged incorrect, then the block $B_{P,1}$ is selected, if, conversely, the block $B_{P,2}$ is judged correct whereas the block $B_{P,1}$ is judged incorrect, then the block $B_{P,2}$ is selected, and, finally if the two blocks $B_{P,1}$ and $B_{P,2}$ are judged incorrect, then a so-called cell by cell selection method is applied for each cell of the two blocks $B_{P,1}$ and $B_{P,2}$, a method of which a preferential embodiment is described below.

It should also be noted that, if the selection device 22 considers groups of blocks and not blocks, an identical method could be used except that it would consider two groups of blocks respectively present on the two links instead of the two blocks $B_{P,1}$ and $B_{P,2}$.

Where the selection device 22 considers blocks, subsets of the blocks delimited by the OAM F3 cells, the correct or incorrect state of each of the blocks, or group of blocks, is determined from information contained in the OAM F3 cell which follows the arrival of the said block or group of blocks.

Where the transmission is of a type other than the "cell-based" mode, the same process can be used and the correct or incorrect state of each block is determined from information contained in the cells which delimit either the blocks between them or the sets of blocks.

Cell by cell selection should be applied only when the two blocks or groups of blocks of cells received on each link are incorrect. If need be, the cell by cell selection method makes it possible to choose, for each cell, the link offering the better performance. Where the block by block, or group of blocks by group of blocks, selection is not used, the system by default carries out cell by cell selection.

According to a preferential embodiment, for each cell of order N in a block transmitted by the TC sub-layer of the transmitter 10, the selection consists of choosing, between the cells $C_{N,1}$ and $C_{N,2}$, the one which has the fewer errors in its header. The error detection is based on the use of the syndrome of the HEC (Header Error Control) field. The polynomial which is used, at the transmission convergence sub-layer of the transmitter, for calculating the HEC field, makes it possible both to detect single or multiple bit errors in the header of each cell, and to correct these errors when single errors are concerned (only one erroneous bit).

According to the invention, to perform the selection of either the cell $C_{N,1}$ or $C_{N,2}$, both the value taken by the function of the HEC($C_{N,X}$) syndrome of the cell $C_{N,X}$, and also that of the function of the HEC syndrome of the cell $C_{N+1,X}$ are used as a basis. Thus:

if the syndromes HEC($C_{N,1}$) and HEC($C_{N,2}$) are equal and if the same applies to the syndromes HEC($C_{N+1,1}$) and HEC($C_{N+1,2}$), choose either cell indiscriminately, if the syndromes HEC($C_{N,1}$) and HEC($C_{N,2}$) are equal whereas a comparison of the syndrome HEC($C_{N+1,1}$) with the syndrome HEC($C_{N+1,2}$) shows that the cell ($C_{N+1,1}$) on the link (1) is less erroneous than the cell ($C_{N+1,2}$) on the link (2), select the cell $C_{N,1}$, if the syndromes HEC($C_{N,1}$) and HEC($C_{N,2}$) are equal whereas a comparison of the syndrome HEC($C_{N+1,1}$) with the syndrome HEC($C_{N+1,2}$) shows that the cell ($C_{N+1,1}$) on the link (1) is more erroneous than the cell ($C_{N+1,2}$) on the link (2), select the cell $C_{N,2}$ if a comparison of the syndrome HEC($C_{N,1}$) with the syndrome HEC($C_{N,2}$) shows that the cell ($C_{N,1}$) on the link (1) is less erroneous than the cell ($C_{N,2}$) on the link (2), select the cell ($C_{N,1}$), and finally if a comparison of the syndrome HEC($C_{N,1}$) with the syndrome HEC($C_{N,2}$) shows that the cell ($C_{N,1}$) on the link (1) is more erroneous than the cell ($C_{N,2}$) on the link (2), select the cell ($C_{N,2}$).

HEC($C_{N,X}$) is a function whose value represents the more or less erroneous nature of the cell $C_{N,X}$ with x=1 or x=2. For example, HEC($C_{N,X}$) is the function whose value gives the number of erroneous bits in this cell. It should be noted that the number of erroneous bits can be determined from the syndrome contained in the HEC field of the cell concerned.

In one embodiment of the present invention, for example:

HEC($C_{N,X}$)=2 if the header of the cell $C_{N,X}$ has no error,

HEC($C_{N,X}$)=1 if there is only a single erroneous bit in the header of the cell $C_{N,X}$, HEC($C_{N,X}$)=0 if there is more than one erroneous bit in the header of the cell $C_{N,X}$.

It should be noted that this value of the function HEC ($C_{N,X}$) is ordered according to the "seriousness" of the error. In the example given, the higher the value, the less significant the error.

Then:

if the syndromes HEC($C_{N,1}$) and HEC($C_{N,2}$) are equal and if the same applies to the syndromes HEC($C_{N+1,1}$) and HEC($C_{N+1,2}$), then either cell will be chosen indiscriminately, if the syndromes HEC($C_{N,1}$) and HEC($C_{N,2}$) are equal whereas the syndrome HEC($C_{N+1,1}$) is greater than the syndrome HEC($C_{N+1,2}$), then the cell $C_{N,1}$ will be selected, if the syndromes HEC($C_{N,1}$) and HEC($C_{N,2}$) are equal whereas the syndrome HEC($C_{N+1,1}$) is less than the syndrome HEC($C_{N+1,2}$), then the cell $C_{N,2}$ will be selected, if the syndrome HEC($C_{N,1}$) is greater than the syndrome HEC($C_{N,2}$), then the cell $C_{N,1}$ will be selected, and finally if the syndrome HEC($C_{N,1}$) is less than the syndrome HEC($C_{N,2}$), then the cell $C_{N,2}$ will be selected.

It should be understood that this ordering could be the reverse, with the result that the above inequalities are reversed.

The fact of taking into account the syndrome of the HEC field of the cells $C_N$ and $C_{N+1}$ makes it possible to not select a cell $C_{N,X}$ whose header has no error but which, following a break in the link which is carrying it, would have erroneous information octets. It should be understood that, in this case, the cell $C_{N+1,X}$ would be erroneous.

In the first case where either cell will be chosen indiscriminately, the choice will preferably be made of the cell $C_{N,X}$ which is carried by the same link as the cell $C_{N-1,X}$ which was chosen previously.

The advantage of this method is to take into account the HEC syndrome of the cells $C_N$ and $C_{N+1}$, as just seen, and also to differentiate cells which have only a single error (only one erroneous bit) and cells which have a multiple error (a number of erroneous bits).

What is claimed is:

1. A method of protecting transmission of cells in a telecommunication system including a transmitter side and a receiver side, the method comprising on the transmitter side, simultaneously transmitting two identical flows of cells on two distinct physical links, and inserting, regularly in each of the flows, cells serving as markers to delimit blocks of cells or sets of blocks of cells, the blocks or sets of blocks each having a physical cell including information concerning errors in the block or in each of the blocks of the set, and, on the receiver side, receiving each of the two flows of cells respectively transmitted on said two links and selecting one of them, selecting the block or group of blocks from one of the flows for which an examination of the error information concerning the block or group of blocks contained in the physical cell shows that the block or group of blocks has the fewer errors in the following manner:

(a) choosing indiscriminately either group of blocks if the two groups of blocks belonging respectively to the two links are judged as being correct;

(b) selecting the group of blocks carried by a first link (1) if the group of blocks carried by the first link (1) is judged as being correct and the group of blocks carried by a second link (2) is judged as being incorrect;

(c) selecting the group of blocks carried by the second link (2) if the group of blocks carried by the second link (2) is judged as being correct and the group of blocks carried by the first link (1) is judged as being incorrect;

(d) using a selection process other than the group of blocks by a group of blocks selection process if the two groups of blocks are judged as being incorrect.

2. Protection method according to claim 1 wherein the other selection process includes performing a so-called cell-by-cell selection for each cell contained in each of two blocks ($B_{P,1}$ and $B_{P,2}$) or groups of blocks, the cell-by-cell selection being based on the use of information of included errors, on the one side, in a header of the present cell and, on the other side, in a header of the following cell.

3. Protection method according to claim 2 wherein the error information is included in a syndrome of an HEC field contained in the header of each cell.

4. Protection method according to claim 3 wherein the cell-by-cell selection includes:
   choosing either cell indiscriminately if syndromes HEC $(C_{N,1})$ and HEC$(C_{N,2})$ are equal and if the same applies to syndromes HEC$(C_{N+1,1})$ and HEC$(C_{N+1,2})$;
   selecting cell $(C_{N,1})$ if the syndromes HEC$(C_{N,1})$ and HEC$(C_{N,2})$ are equal and if a comparison of the syndrome HEC$(C_{N+1,1})$ with the syndrome HEC$(C_{N+1,2})$ shows that the cell $(C_{N+1,1})$ on link (1) is less erroneous than the cell $(C_{N+1,2})$ on link (2);
   selecting cell $C_{N,2}$ if the syndromes HEC$(C_{N,1})$ and HEC $(C_{N,2})$ are equal and a comparison of the syndrome HEC$(C_{N+1,1})$ with the syndrome HEC$(C_{N+1,2})$ shows that the cell $(C_{N+1,1})$ on link (1) is more erroneous than the cell $(C_{N+1,2})$ on link (2);
   selecting cell $(C_{N,1})$ if a comparison of the syndrome HEC$(C_{N,1})$ with the syndrome HEC$(C_{N,2})$ shows that the cell $(C_{N,1})$ on link (1) is less erroneous than the cell $(C_{N,2})$ on link (2); and
   selecting cell $(C_{N,2})$ if a comparison of the syndrome HEC$(C_{N,1})$ with the syndrome HEC$(C_{N,2})$ shows that the cell $(C_{N,1})$ on link (1) is more erroneous than the cell $(C_{N,2})$ on link (2);
   where HEC$(C_{N,X})$ is a function whose value represents the more or less erroneous nature of the cell $C_{N,X}$ $C_{N,X}$ being the cell of order N in the block under consideration and x being the number of the link on which the said cell is carried.

5. Protection method according to claim 1 further including performing a cell-by-cell selection if the block-by-block or group-of blocks-by-groups-of-blocks selection is not used at a given moment.

6. Protection method according to claim 1 further including, on the transmitter side, inserting regularly, in each of the flows, cells having an order number which is used for synchronizing the flows issuing respectively from links (1) and (2).

7. Protection method according to claim 1 further including using the physical cells containing the error information as cells serving as markers for blocks.

8. Protection method according to claim 7 wherein the method is applied to a telecommunication system in which the transmission of cells on each link takes place in a cell-based mode, and using OAM F3 cells as cells serving as markers for blocks.

9. A receiver for use in a telecommunication system capable of protecting transmission of cells, the receiver being adapted to be responsive to a transmitter for simultaneously transmitting two identical flows of cells on two distinct physical links, and for inserting, regularly in each of the flows, cells serving as markers to delimit blocks of cells or sets of blocks of cells, the blocks or sets of blocks each having a physical cell including information concerning errors in the block or in each of the blocks of the set; the receiver comprising:
   a selector connected to be responsive to each of the two flows of cells respectively transmitted on said two links, the selector being arranged for selecting the block or group of blocks from one of the flows for which an examination of error information concerning the block or group of blocks contained in the physical cell shows that the block or group of blocks has the fewer errors, the selector being arranged for:
   (a) choosing indiscriminately either group of blocks if the two groups of blocks belonging respectively to the two links are judged as being correct;
   (b) selecting the group of blocks carried by a first link (1) if the group of blocks carried by the first link (1) is judged as being correct and the group of blocks carried by a second link (2) is judged as being incorrect;
   (c) selecting the group of blocks carried by the second link (2) if the group of blocks carried by the second link (2) is judged as being correct and the group of blocks carried by the first link (1) is judged as being incorrect;
   (d) using a selection process other than the group of blocks by a group of blocks selection process if the two groups of blocks are judged as being incorrect.

10. The receiver of claim 9 wherein the selector is arranged for performing the other selection process by performing a so-called cell-by-cell selection for each cell contained in each of two blocks ($B_{P,1}$ and $B_{P,2}$) or groups of blocks, the cell-by-cell selection being based on the use of information of included errors, on the one side, in a header of the present cell and, on the other side, in a header of the following cell.

11. The receiver of claim 10 wherein the error information is included in a syndrome of an HEC field contained in a header of each cell.

12. The receiver of claim 11 wherein the selector is arranged for performing cell-by-cell selection by:
   (a) choosing either cell indiscriminately if syndromes HEC$(C_{N,1})$ and HEC$(C_{N,2})$ are equal and if the same applies to syndromes HEC$(C_{N+1,1})$ and HEC$(C_{N+1,2})$;
   (b) selecting cell $(C_{N,1})$ if the syndromes HEC$(C_{N,1})$ and HEC$(C_{N,2})$ are equal and if a comparison of the syndrome HEC$(C_{N+1,1})$ with the syndrome HEC$(C_{N+1,2})$ shows that the cell $(C_{N+1,1})$ on link (1) is less erroneous than the cell $(C_{N+1,2})$ on link (2);
   (c) selecting cell $C_{N,2}$ if the syndromes HEC$(C_{N,1})$ and HEC$(C_{N,2})$ are equal and a comparison of the syndrome HEC$(C_{N+1,1})$ with the syndrome HEC$(C_{N+1,2})$ shows that the cell $(C_{N+1,1})$ on link (1) is more erroneous than the cell $(C_{N+1,2})$ on link (2);
   (d) selecting cell $(C_{N,1})$ if a comparison of the syndrome HEC $(C_{N,1})$ with the syndrome HEC$(C_{N,2})$ shows that the cell $(C_{N,1})$ on link (1) is less erroneous than the cell $(C_{N,2})$ on link (2); and
   (e) selecting cell $(C_{N,2})$ if a comparison of the syndrome HEC $(C_{N,1})$ with the syndrome HEC$(C_{N,2})$ shows that the cell $(C_{N,1})$ on link (1) is more erroneous than the cell $(C_{N,2})$ on link (2);
   where HEC$(C_{N,X})$ is a function whose value represents the more or less erroneous nature of the cell $C_{N,X}$ $C_{N,X}$ being the cell of order N in the block under consideration and x being the number of the link on which the said cell is carried.

13. The receiver of claim 9 wherein the selector is arranged for performing a cell-by-cell selection if the block-by-block or group-of blocks-by-groups-of-blocks selection is not used at a given moment.

14. The receiver of claim 9 further including an output device connected to be responsive to the selector for using the physical cells containing the error information as cells serving as markers for blocks.

15. A telecommunication system capable of protecting cells transmitted from a transmitter to a receiver, the system comprising a transmitter and a receiver, the transmitter including: a signal processor for (a) deriving two identical flows of cells on two distinct physical links, and (b) inserting, regularly in each of the flows, cells serving as markers to delimit blocks of cells or sets of blocks of cells, the blocks or sets of blocks each having a physical cell including information concerning errors in the block or in each of the blocks of the set, and an output device connected to be responsive to the signal processor for simultaneously transmitting the two identical flows of cells on two distinct physical links, the receiver including:
  a selector connected to be responsive to each of the two flows of cells respectively transmitted on said two links, the selector being arranged for selecting the block or groups of blocks from one of the flows for which an examination of error information concerning the block or group of blocks contained in the physical cell shows that the block or group of blocks has the fewer errors, the selector being arranged for:
    (a) choosing indiscriminately either group of blocks if the two groups of blocks belonging respectively to the two links are judged as being correct;
    (b) selecting the group of blocks carried by a first link (1) if the group of blocks carried by the first link (1) is judged as being correct and the group of blocks carried by a second link (2) is judged as being incorrect;
    (c) selecting the group of blocks carried by the second link (2) if the group of blocks carried by the second link (2) is judged as being correct and the group of blocks carried by the first link (1) is judged as being incorrect;
    (d) using a selection process other than the group of blocks by a group of blocks selection process if the two groups of blocks are judged as being incorrect.

16. The system of claim 15 wherein the selector is arranged for performing the other selection process by performing a so-called cell-by-cell selection for each cell contained in each of two blocks ($B_{P,1}$ and $B_{P,2}$) or groups of blocks, the cell-by-cell selection being based on the use of information of included errors, on the one side, in a header of the present cell and, on the other side, in a header of the following cell.

17. The system of claim 16 wherein the error information is included in a syndrome of an HEC field contained in a header of each cell.

18. The system of claim 17 wherein the selector is arranged for performing cell-by-cell selection by:
  (a) choosing either cell indiscriminately if syndromes $HEC(C_{N,1})$ and $HEC(C_{N,2})$ are equal and if the same applies to syndromes $HEC(C_{N+1,1})$ and $HEC(C_{N+1,2})$;
  (b) selecting cell ($C_{N,1}$) if the syndromes $HEC(C_{N,1})$ and $HEC(C_{N,2})$ are equal and if a comparison of the syndrome $HEC(C_{N+1,1})$ with the syndrome $HEC(C_{N+1,2})$ shows that the cell ($C_{N+1,1}$) on link (1) is less erroneous than the cell ($C_{N+1,2}$) on link (2);
  (c) selecting cell $C_{N,2}$ if the syndromes $HEC(C_{N,1})$ and $HEC(C_{N,2})$ are equal and a comparison of the syndrome $HEC(C_{N+1,1})$ with the syndrome $HEC(C_{N+1,2})$ shows that the cell ($C_{N+1,1}$) on link (1) is more erroneous than the cell ($C_{N+1,2}$) on link (2);
  (d) selecting cell ($C_{N,1}$) if a comparison of the syndrome $HEC(C_{N,1})$ with the syndrome $HEC(C_{N,2})$ shows that the cell ($C_{N,1}$) on link (1) is less erroneous than the cell ($C_{N,2}$) on link (2); and
  (e) selecting cell ($C_{N,2}$) if a comparison of the syndrome $HEC(C_{N,1})$ with the syndrome $HEC(C_{N,2})$ shows that the cell ($C_{N,1}$) on link (1) is more erroneous than the cell ($C_{N,2}$) on link (2);
  where $HEC(C_{N,x})$ is a function whose value represents the more or less erroneous nature of the cell $C_{N,x}$ $C_{N,x}$ being the cell of order N in the block under consideration and x being the number of the link on which the said cell is carried.

19. The system of claim 15 wherein the selector is arranged for performing a cell-by-cell selection if the block-by-block or group-of blocks-by-groups-of-blocks selection is not used at a given moment.

20. The system of claim 15 further including an output device connected to be responsive to the selector for using the physical cells containing the error information as cells serving as markers for blocks.

21. The system of claim 20 wherein the signal processor is arranged for causing the cells on each link to take place in a cell-based mode, and for causing the cells to be OAM F3 cells that serve as markers for blocks.

22. The system of claim 15 wherein the signal processor is arranged for inserting regularly, in each of the flows, cells having an order number which is used for synchronizing the flows issuing respectively from the links.

* * * * *